United States Patent
Craig

(10) Patent No.: US 7,337,174 B1
(45) Date of Patent: Feb. 26, 2008

(54) LOGIC TABLE ABSTRACTION LAYER FOR ACCESSING CONFIGURATION INFORMATION

(75) Inventor: Robert M. Craig, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/360,440

(22) Filed: Jul. 26, 1999

(51) Int. Cl.
*G06F 17/30* (2006.01)

(52) U.S. Cl. .................... 707/100; 707/3; 707/10; 707/102; 707/103 X

(58) Field of Classification Search .............. 707/100, 707/101, 102, 103, 3
See application file for complete search history.

(56) References Cited

U.S. PATENT DOCUMENTS

| | | | |
|---|---|---|---|
| 5,287,507 A | 2/1994 | Hamilton et al. | 395/650 |
| 5,485,617 A | 1/1996 | Stutz et al. | |
| 5,517,645 A | 5/1996 | Stutz et al. | |
| 5,581,765 A * | 12/1996 | Munroe et al. | 719/315 |
| 5,602,993 A | 2/1997 | Stromberg | 171/11 |
| 5,655,148 A | 8/1997 | Richman et al. | 395/828 |
| 5,689,703 A | 11/1997 | Atkinson et al. | 395/614 |
| 5,706,505 A | 1/1998 | Fraley et al. | |
| 5,758,154 A | 5/1998 | Qureshi | 395/651 |
| 5,791,499 A | 8/1998 | Zebbedies | 707/10 |
| 5,794,038 A | 8/1998 | Stutz et al. | |
| 5,809,495 A * | 9/1998 | Loaiza | 707/2 |
| 5,822,580 A * | 10/1998 | Leung | 707/103 R |
| 5,842,018 A | 11/1998 | Atkinson et al. | 395/700 |
| 5,848,234 A | 12/1998 | Chernick et al. | 395/200.33 |
| 5,890,014 A | 3/1999 | Long | 395/828 |
| 5,890,161 A | 3/1999 | Helland et al. | 707/103 |
| 5,899,987 A * | 5/1999 | Yarom | 707/3 |
| 5,911,068 A | 6/1999 | Zimmerman et al. | |
| 5,933,646 A | 8/1999 | Hendrickson et al. | 717/11 |
| 5,950,011 A | 9/1999 | Albrecht et al. | 395/712 |
| 5,970,490 A | 10/1999 | Morgenstern | 707/10 |
| 6,003,097 A | 12/1999 | Richman et al. | 710/8 |
| 6,018,725 A | 1/2000 | Boucher et al. | 717/11 |
| 6,038,399 A | 3/2000 | Fisher et al. | 395/712 |
| 6,085,030 A * | 7/2000 | Whitehead et al. | 709/203 |
| 6,092,189 A | 7/2000 | Fisher et al. | 713/1 |
| 6,108,661 A * | 8/2000 | Caron et al. | 707/102 |
| 6,144,959 A | 11/2000 | Anderson et al. | 707/9 |
| 6,144,960 A | 11/2000 | Okada et al. | 707/10 |
| 6,151,707 A | 11/2000 | Hecksel et al. | 717/11 |

(Continued)

OTHER PUBLICATIONS

Souza et al. Proposal of a Multilayer Shield Design Using Genetic Algorithm, Instrumentation and Measurement. vol. 3, p. 2300-2305, May 16-19, 2005.*

(Continued)

*Primary Examiner*—Shahid Alam
*Assistant Examiner*—Baoquoc N. To
(74) *Attorney, Agent, or Firm*—Merchant & Gould P.C.

(57) ABSTRACT

A logic table object for accessing configuration information sourced by one or more datastores is employed in a catalog environment of an attribute-based programming model. A logic table object may provide supplemental logic, consolidate multiple underlying tables, map between different disparate table coordinates, trigger external operations, and synthesize data for inclusion in a virtual table presented to a caller. A logic table object can provide access to configuration information cached in an underlying data table object and derived from a datastore. Alternatively, a logic table can include its own cache, servicing calls therefrom until an update to or from an underlying datastore is required.

29 Claims, 10 Drawing Sheets

U.S. PATENT DOCUMENTS

| | | | | |
|---|---|---|---|---|
| 6,154,878 | A | 11/2000 | Saboff | 717/11 |
| 6,161,151 | A | 12/2000 | Sudhakaran et al. | 710/10 |
| 6,167,395 | A * | 12/2000 | Beck et al. | 707/3 |
| 6,167,567 | A | 12/2000 | Chiles et al. | 717/11 |
| 6,185,734 | B1 | 2/2001 | Saboff et al. | 717/11 |
| 6,199,157 | B1 | 3/2001 | Dov et al. | 713/1 |
| 6,230,312 | B1 * | 5/2001 | Hunt | 717/108 |
| 6,247,128 | B1 | 6/2001 | Fisher et al. | 713/100 |
| 6,263,348 | B1 | 7/2001 | Kathrow et al. | 707/203 |
| 6,339,783 | B1 * | 1/2002 | Horikiri | 709/203 |
| 6,421,682 | B1 * | 7/2002 | Craig et al. | 707/103 R |
| 6,442,620 | B1 * | 8/2002 | Thatte et al. | 719/316 |
| 6,449,659 | B1 * | 9/2002 | Caron et al. | 719/315 |
| 6,466,943 | B1 * | 10/2002 | Craig | 707/102 |
| 6,477,550 | B1 * | 11/2002 | Balasubramaniam et al. | 715/513 |
| 6,487,552 | B1 * | 11/2002 | Lei et al. | 707/4 |
| 6,513,112 | B1 * | 1/2003 | Craig et al. | 719/316 |
| 6,574,736 | B1 * | 6/2003 | Andrews | 726/21 |
| 6,598,037 | B1 * | 7/2003 | Craig et al. | 707/1 |
| 6,687,710 | B1 | 2/2004 | Dey | 707/104.1 |
| 6,728,963 | B1 * | 4/2004 | Forin et al. | 719/310 |
| 6,988,271 | B2 * | 1/2006 | Hunt | 719/315 |
| 7,039,919 | B1 * | 5/2006 | Hunt | 719/316 |
| 7,143,421 | B2 * | 11/2006 | Forin et al. | 719/331 |
| 7,159,222 | B1 * | 1/2007 | Forin et al. | 719/310 |
| 2003/0033441 | A1 * | 2/2003 | Forin et al. | 709/315 |
| 2003/0145124 | A1 * | 7/2003 | Guyan et al. | 709/318 |

OTHER PUBLICATIONS

Vogels et al. Quintet, tools for reliable enterprise comuting, Enterprise Distributed Object Workshop, pp. 2784-280, Nov. 3-5, 1998.*

Gil et al. Environment acquisition: a new inheritance-like abstraction mechanism, Conference of Object Oriented Programminmg Language and Appications, pp. 214-231, 1996.□□*

Niz et al. Time Weaver: a software-through-models frame work for embedded real-time systems, Language, Compiler and Tool Support for Embbeded Systems, pp. 133-143, 2003.*

Dale Rogerson, *Inside COM*, 1997; Chapter 1,; pp. 116-126.

Distributed Computing Monitor vol. 13. No. 11; *COM+ The Future of Microsoft's Component Object Model*, Featured Report by David Chappell; pp. 3-16, Nov. 1998.

Roberson, Dale; "Components", *Inside Com*; Chapter 1, 1997; pp. 1-13.

Smith, et al.; "A Case for Meta-Internetworking; Projecting CORBA Meta-data into Com", Proceedings of the 1998 Conference on Technology of Object-Oriented Languages; Nov. 23-26, 1998; pp. 242-253, IEEE 98TB100271.

Simon; "Building Component Software with COM and Eiffel", Microsoft Corp. 1992-1995. pp. 364-374.

Nicoloudis et al.; "Implementing Trading Object Services in COM"; IEEE, 2000, pp. 230-239.

Wang, et al., Customization of Distributed Systems Using COM, IEEE, 1998, pp. 8-12.

* cited by examiner

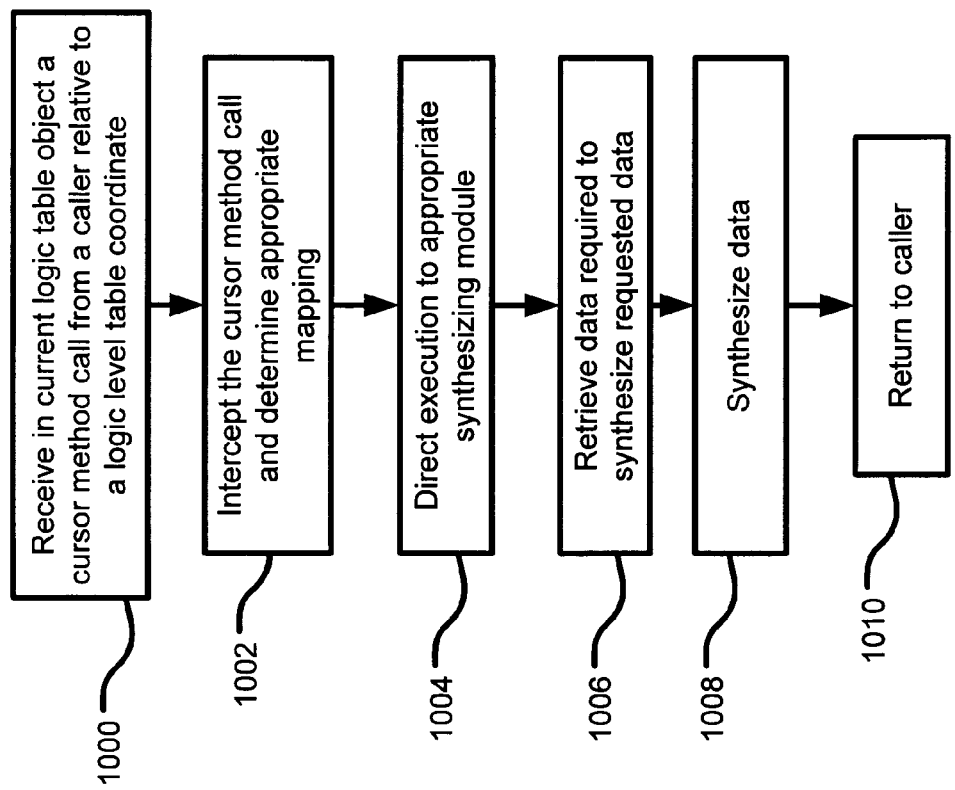

US 7,337,174 B1

LOGIC TABLE ABSTRACTION LAYER FOR ACCESSING CONFIGURATION INFORMATION

TECHNICAL FIELD

The invention relates generally to object-oriented data processing and system management, and more particularly to a logic table abstraction layer used to access configuration information in a catalog environment.

BACKGROUND OF THE INVENTION

In a distributed computer environment, client computer systems and server computer systems can share data and executable program code, including applications, services, and resources. In order to facilitate the sharing of these various elements, attribute-based programming allows a developer to specify the services and resources required by an application by setting properties (or "attributes") of each application or component rather than implementing or calling those services directly from the implementation code. Attributes include a particular set of configuration information that is made available to various callers in an attribute-based programming environment.

Configuration information may be stored on the various machines in the distributed network and relates to specific properties of applications, components, services, and other resources available to that machine. In existing approaches, a system "registry" has been used to store configuration information for a particular machine. However, in existing approaches, a programmer is required to access and manipulate registry information directly, introducing undesirable program complexity and exposing the registry to corruption by improper programming. Moreover, the distribution of configuration information among multiple datastores (i.e., in addition to the registry) and data formats is not accommodated by existing approaches, particularly if the location and format of data is expected to evolve over time. In current approaches, the implementation code itself must be altered in order to handle location and format changes to configuration information. Accordingly, existing approaches lack location and format independence that can provide the desired flexibility for storage and access to configuration information in a computer system.

SUMMARY OF THE INVENTION

In accordance with the present invention, the above and other problems are solved by providing a logic table object that abstracts access to underlying configuration data. A logic table object can provide supplemental logic and trigger external operations not provided by underlying table objects and datastores. Furthermore, a logic table object can synthesize data not available from underlying table objects. In addition, a logic table object maps coordinates of a logic level table to one or more coordinates of underlying tables.

A computer program product providing domain-specific access to configuration information sourced by at least one datastore, wherein the domain-specific access is substantially specified by at least one input parameter, is provided. A first level table object is instantiated in accordance with a input parameter. The first level table object includes a first table-oriented interface having a first table-oriented method. A call is received to the first table-oriented method in the first level table object. A logic component module executes, responsive to the call, if the first level table object provides domain-specific logic corresponding to the first table-oriented method. The call is delegated to a corresponding table-oriented method of a lower-level table object to which the first level table object is bound, if the first level table object depends on the lower-level table object to completely service the call.

A logic table object, executable by a computer, provides domain-specific access to configuration information sourced by at least one datastore, wherein the domain-specific access is substantially specified by at least one input parameter. A table-oriented interface includes a table-oriented method accessible by a caller to access the configuration information and receives a call from the caller to the table-oriented method. A logic component module providing domain-specific logic to the table-oriented method. An interception/delegation module executes the domain-specific logic of the logic component module, responsive to receipt of the call, and further delegates the call to a corresponding table-oriented method of a lower-level table object to which the logic table object is bound, if the logic table object depends on the lower-level table object to completely service the call.

BRIEF DESCRIPTION OF THE DRAWINGS

FIG. 10 illustrates a flowchart of operations for synthesizing data in an embodiment of the present invention.

DETAILED DESCRIPTION OF THE INVENTION

An embodiment of the present invention includes a logic table object for accessing configuration information sourced by one or more datastores. In a preferred embodiment, logic table objects are employed in a catalog environment of an attribute-based programming model; however, embodiments of the present invention can be broadly applied to access any type of data. A logic table object may provide supplemental logic, consolidate multiple underlying tables, map between disparate table coordinates, trigger external operations, and synthesize data for inclusion in a virtual table presented to a caller.

Figure 1:
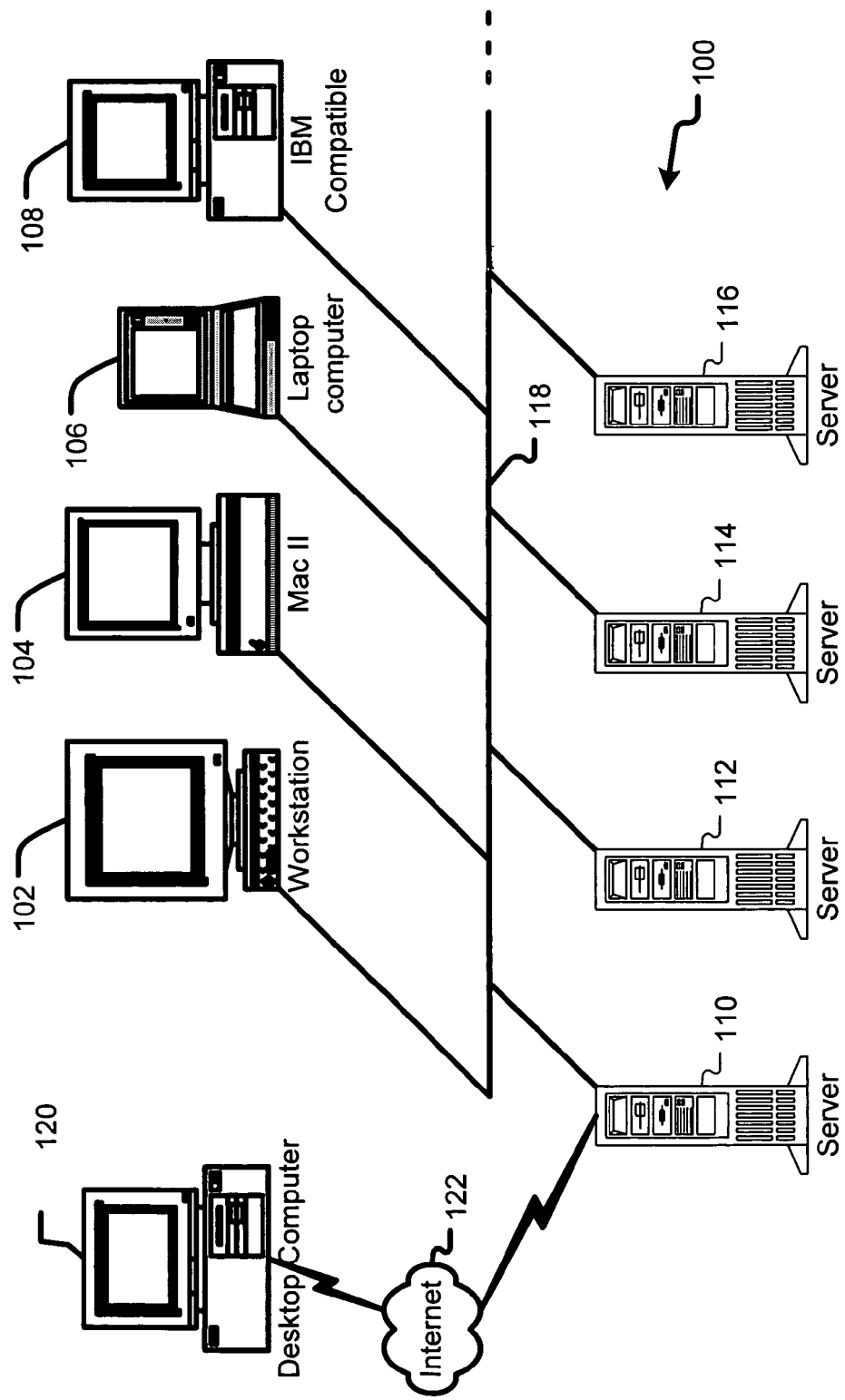
FIG. 1 illustrates a pictorial representation of a suitable client-server computing environment in which an embodiment of the present invention may be implemented in both clients and servers.

FIG. 1 is a pictorial representation of a suitable client-server computing environment in which an embodiment of the present invention may be implemented in both clients and servers. In a computing network 100, client computer systems 102, 104, 106 and 108 are connected to server computer systems 110, 112, 114 and 116 by a network connection 118. Additionally, client computer 120 is connected to server computer 110 via a communication link, such as the Internet 122 or a local area network. Since the server 110 is connected via the network connection 118 to the other servers 112, 114 and 116, the client computer 120 is also connected and may access information on the other servers 112, 114 and 116, and clients 102, 104, 106, and 108, as well as other computer systems coupled to the network 100.

The client computer systems 102, 104, 106, 108 and 120 operate using at least some of the information and processes available on at least one of the servers 110, 112, 114 and 116 as well as other computer systems coupled to the network 100. Each client is preferably a complete, stand-alone computer and offers the user a full range of power and features for running applications. The clients 102, 104, 106 and 108, however, may be quite different from the other clients as long as they can communicate via the common interface 118.

The servers 110, 112, 114 and 116 are preferably computers, minicomputers, or mainframes that provide traditional strengths offered by minicomputers and mainframes in a time-sharing environment (e.g., data management, information sharing between clients, and sophisticated network administration and security features). The client and server machines work together to accomplish the processing of the executed application. Working together in this manner increases the processing power and efficiency relating to each independent computer system shown in FIG. 1.

Typically, a client portion or process of an application executed in the distributed network 100 is optimized for user interaction whereas a server portion or process provides the centralized, multi-user functionality. However, each client computer 102, 104, 106, 108 and 120 can perform functions for other computers, including the clients and servers, thus acting as a "server" for those other computer systems. Similarly, each of the servers 110, 112, 114 and 116 can perform functions and relay information to the other servers, such that each server may act as a "client" requesting information or services from another computer in particular circumstances. Therefore, the term "client," as used hereinafter refers to any computer system making a call or request of another computer system and the term "server" is the computer system servicing the request.

As part of the sophisticated network administration, each computer is able to access configuration information related to applications and resources available on the other computers in the network 100. The configuration information is located within memory or persistent storage on each computer system, i.e., in a datastore. Additionally, each computer system may have more than one datastore of configuration information that must be accessed by the other computer systems. Moreover, the different datastores may each have different data types or formats. In order to access configuration information from these many and various computer datastores, a client, i.e., the system or process making the request for information, communicates with a "catalog" interface on the computer system.

Figure 2:
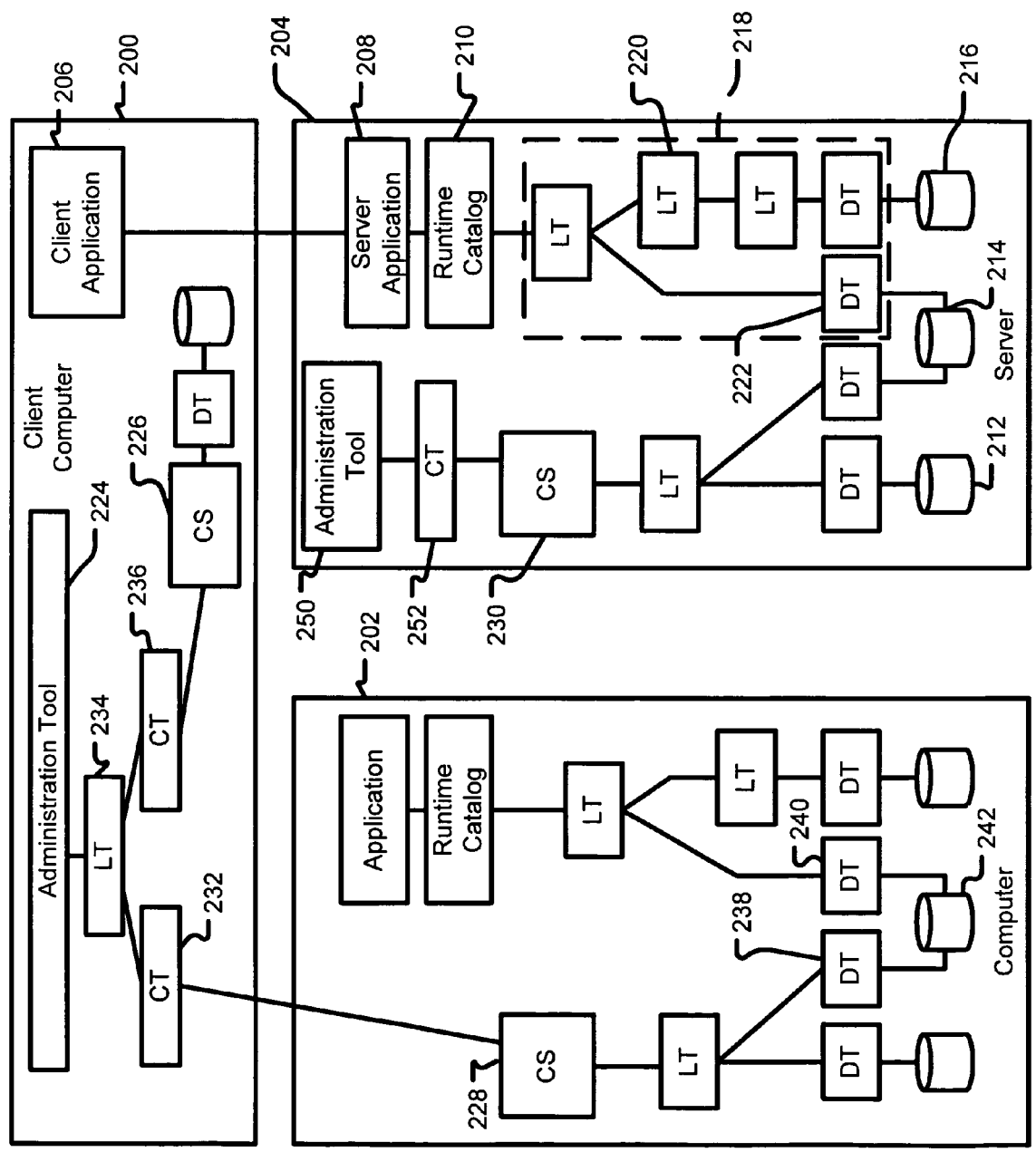
FIG. 2 depicts an exemplary client/server architecture employing COM+ catalogs (Component Object Model) in accordance with the present invention.

FIG. 2 depicts an exemplary client/server architecture employing COM+ catalogs in accordance with the present invention (COM is an acronym for Component Object Model). A COM+ Catalog is a virtualized database of COM+ applications and their services, with runtime and configuration-time abstraction layers for using and manipulating configuration information. An embodiment of the present invention, for example, may be employed in a component-based programming model of a transaction processing runtime environment for developing, deploying, and managing high-performance, scaleable, and robust enterprise Internet and intranet server applications.

A "component" is software containing classes that may be created and exposed as "objects" (i.e., self-contained programmed entities that consist of both data and functions to manipulate the data) for use by another application. A component can also use objects exposed by another application. For example, a developer can create an application using ActiveX components that can be updated and managed easily as in-process DLLs (Dynamic Link Libraries). The DLLs are then installed into the COM environment for execution within the application. Components can be developed specifically for a developer's single application, developed for use with multiple applications, or purchased from a third party.

COM technology allows a piece of software to offer services to another piece of software by making those services available as "COM objects". COM is a foundation for an object-based system that focuses on reuse of interfaces. It is also an interface specification from which any number of interfaces can be built. Each COM object is an instance of a particular class and supports a number of interfaces, generally two or more. Each interface includes one or more methods, which are functions that can be called by the objects' clients.

COM+ technology is an extension of COM technology that includes a new runtime library that provides a wide range of new services, such as dynamic load balancing, queued components, an in-memory database, and events. COM+ technology maintains the basics of COM technology, and existing COM-based applications can continue to work unchanged in a COM+ environment.

An object implemented to comply with COM+ is referred to as a "COM+ object". A component that includes one or more classes that may be instantiated as a COM+ object is referred to as a "COM+ component". Each COM+ component has attributes, which can be set in a component (or type) library. Attributes are a form of configuration data required by many software components to execute correctly and completely. An application that includes COM+ components is referred to as a "COM+ application". When a component is made part of a COM+ application, its component (or type) library is written into a COM+ catalog. When an object is instantiated from that component, the attributes in the COM+ catalog are examined to determine the object context that contains properties for the object. Based on the object context, other services required by the object are provided. In this manner, a developer can merely identify in the attributes the additional functionality required by the object, and based on the object's attributes, the appropriate other services that are available within the system, or the accessible network, are executed to provide that functionality.

In FIG. 2, a client computer 200 is coupled via a network to one or more remote computers (e.g., a computer 202 and a server 204). Although the embodiments of the present invention are illustrated and described herein relative to multiple computer systems coupled by a computer network or other communications connection, it is to be understood that an embodiment of the present invention may be employed in a stand-alone computer system to provide access to configuration information in the system.

A client application 206 executes on the client computer 200 to access a server application 208 executing on the server 204. For example, the server application 208 may include a database application that receives a query from the client application 206 and accesses a customer database (not shown) for all customer data satisfying the query. During operation, the server application 208 may require configuration data recorded in a datastore (such as datastores 214 or 216). For example, a transaction server application can determine the security level of a user according to a "role" assigned to the user by an administrator or other means. Accordingly, the transaction server application might query a role definitions database to validate the user's access to a transaction database (not shown). In another example, the server application 208 accesses configuration information to verify that required services are available for its execution.

To obtain configuration information in the illustrated embodiment, the server application 208 accesses a runtime catalog 210 running on the server 204. The runtime catalog 210 causes one or more table object dispensers to create catalog table objects (shown generally as table system 218) providing the required configuration data in a table to the server application 208. A "table object" includes an object that provides a caller with access to underlying data, presenting that data in virtual "table" format through a defined table interface. A table object may also provide its own functionality, read and write caching and the triggering of external events, in addition to other features. The table data is accessed by a caller (e.g., a catalog server, a runtime catalog, or an overlaying logic table object) by way of a table-oriented interface, preferably including table cursor methods. In the exemplary embodiment, the runtime catalog 210 accesses configuration data in the datastores 214 and 216 through layers of abstraction provided by the table system 218 (i.e., including logic table objects (LT), such as logic table object 220, and data table objects (DTs), such as data table object 222).

A globally unique database ID (identifier) called a "DID" identifies each catalog database. A given DID guarantees a minimum well-defined set of catalog tables, each table being identified by and complying to the rules of a table ID (TID). A DID is a datastore-independent identity, meaning that the tables of that database can be distributed among multiple datastores. Examples of datastores include the registry, type libraries, SQL (structured query language) Servers, and the NT Directory Service (NT DS), whereas examples of databases include: server group databases, download databases, and deployment databases.

A data table object, such as data table object 222, is a datastore-dependent table object that exposes a table cursor into a particular datastore. The table cursor provides a well-defined table-oriented interface into the datastore while hiding the location and format of the underlying datastore itself. For example, a caller can use a table cursor to navigate through the rows of a column in a table presented to the caller by a table object.

Each data table object is bound to a particular datastore accessible within the computer. For example, a data table object may be bound to the registry to provide the registry data in table form to a higher level (e.g., an overlaid logic table object, catalog server object, or runtime catalog). Another data table object may be bound to the NT Directory Services to provide directory configuration data to a higher level. As shown by data table objects 238 and 240, multiple data table objects may be created for a single datastore (e.g., data table objects 238 and 240 are created by different logic tables objects to provide access to the same datastore 242).

The data table object 222 populates one or more internal caches with read or write data associated with the datastore 214. Queries to the datastore 214 are serviced by the cache or caches through the data table object's table interface. Using at least one "update" method, data in the reach cache of data table object 222 may be refreshed from the datastore 214 and data in a write cache may be flushed to the datastore 214. Data table objects are described in more detail in U.S. patent application Ser. No. 09/360,442, now U.S. Pat. No. 6,598,037, entitled "DATA TABLE OBJECT INTERFACE FOR DATASTORE," assigned to the assignee of the present application, filed concurrently herewith and incorporated herein by reference for all that it discloses and teaches.

A logic table object, such as logic table object 220, presents domain-specific table data by logically merging or consolidating table data from multiple data table and/or logic table objects, supplementing table functionality, and/or synthesizing data into the table, in accordance with a given type of configuration information requested (e.g., configuration information for Components, Applications, etc.). The domain-specific nature of the table data is preferably defined by at least one input parameter, including without limitation a database ID, a table ID, a query parameter, or a level of server parameter. Logic table objects in a COM+ Catalog environment are type-independent abstraction layers between a caller (such as the runtime catalog 210) and one or more datastores (such as datastores 214 and 216) containing configuration information. A logic table object typically sits atop one or more data table objects and introduces domain-specific rules and processes to the underlying data table objects, although other configurations of table systems are possible (see FIG. 4).

More specifically, a logic table object can logically merge or consolidate configuration data from multiple data table and/or logic table objects into a single table based on predetermined logic (e.g., according to type). Furthermore, a logic table object can supplement data table object functionality by intercepting interface calls from a client and adding to or overriding the underlying table object functionality (e.g., adding validation or security). Additionally, a logic table object can synthesize data that is not available from the underlying datastores or tables and present the synthesized data as part of the table.

The foregoing discussion has described the COM+ Catalog environment as used at runtime by an application. An alternate use of a COM+ Catalog occurs at configuration-time and may employ one or more catalog server objects (CS) and one or more client tables. During configuration, an administration tool, such as Microsoft's Component Services administration tool or COMAdmin Library, is used to create and configure COM+ applications, install and export existing COM+ applications, manage installed COM+ applications, and manage and configure services locally or remotely. Accordingly, in addition to the illustrated embodiments, an embodiment of the present invention may be employed by a local administration tool managing an application running on a remote computer system.

The exemplary administration tool 224 executes on the client computer 200 in FIG. 2. An alternative administration tool (such as administration tool 250) can execute on another computer (such as server 204) to configure applications and services executing in the computer. A catalog server object, such as catalog server objects 226, 228, and 230, manages configuration information on its computer. All administration requests to a computer, whether local or from another computer, go to a catalog server object on that computer, preferably through one or more abstraction layers, including client table objects and logic table objects.

A client table object (CT) is analogous to a data table object that binds to a particular local or remote catalog server object instead of a datastore, presenting the configuration information marshaled by a catalog server object in table form to the caller, such as the administration tool 224. The local catalog server object 226 manages configuration data locally on the client computer 200, while the remote catalog server object 228 service catalog requests from the client table object 232 for configuration information on its remote computer. "Remote" does not necessarily imply that a remote computer geographically distant from a local computer. Instead, remote merely indicates a cross-computer boundary, which may be bridged by a data bus, a network connection, or other connection means.

To access available catalog data in the illustrated exemplary embodiment, the administration tool 224 optionally causes a logic table object 234 to be created, which in turn causes client table objects 232 and 236 to be created for accessing available catalog server objects 226, and 228. The local catalog server object 226 and the remote catalog server object 228 marshal the configuration information stored within their corresponding computers by causing creation of underlying table systems and transferring the data back to the client table objects 232 and 236 for presentation as table data to the logic table object 234, which logically merges the configuration information and presents the configuration information to the administration tool 224 in table format. In the illustrated embodiment, multiple domain-specific logic table objects (such as logic table object 234) can reside between the client table objects 232 and 236, and the administration tool 224. Alternatively, the administration tool 224 may cause only a single client table object (with or without overlaying logic table objects) to be created to access a single catalog server object on a local or remote computer.

Figure 3:
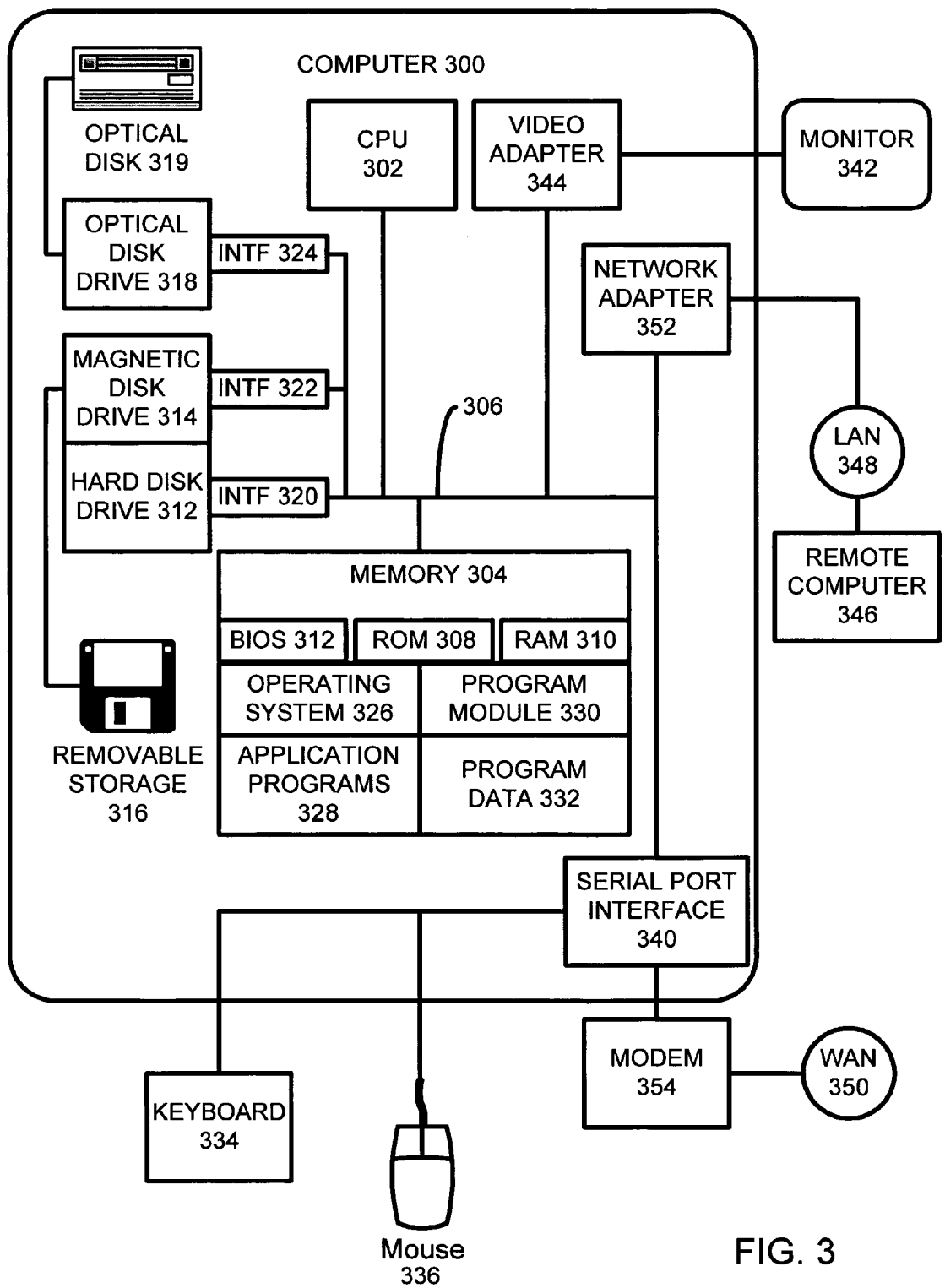
FIG. 3 illustrates an exemplary system for implementing the invention in an embodiment of the present invention.

With reference to FIG. 3, an exemplary computing system for embodiments of the invention includes a general purpose computing device in the form of a conventional computer system 300, including a processor unit 302, a system memory 304, and a system bus 306 that couples various system components including the system memory 304 to the processor unit 302. The system bus 306 may be any of several types of bus structures including a memory bus or memory controller, a peripheral bus and a local bus using any of a variety of bus architectures. The system memory includes read only memory (ROM) 308 and random access memory (RAM) 310. A basic input/output system 312 (BIOS), which contains basic routines that help transfer information between elements within the computer system 300, is stored in ROM 308.

The computer system 300 further includes a hard disk drive 312 for reading from and writing to a hard disk, a magnetic disk drive 314 for reading from or writing to a removable magnetic disk 316, and an optical disk drive 318 for reading from or writing to a removable optical disk 319 such as a CD ROM, DVD, or other optical media. The hard disk drive 312, magnetic disk drive 314, and optical disk drive 318 are connected to the system bus 306 by a hard disk drive interface 320, a magnetic disk drive interface 322, and an optical drive interface 324, respectively. The drives and their associated computer-readable media provide nonvolatile storage of computer readable instructions, data structures, programs, and other data for the computer system 300.

Although the exemplary environment described herein employs a hard disk, a removable magnetic disk 316, and a removable optical disk 319, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 319, ROM 308 or RAM 310, including an operating system 326, one or more application programs 328, other program modules 330, and program data 332. A user may enter commands and information into the computer system 300 through input devices such as a keyboard 334 and mouse 336 or other pointing device. Examples of other input devices may include a microphone, joystick, game pad, satellite dish, and scanner. These and other input devices are often connected to the processing unit 302 through a serial port interface 340 that is coupled to the system bus 306. Nevertheless, these input devices also may be connected by other interfaces, such as a parallel port, game port, or a universal serial bus (USB). A monitor 342 or other type of display device is also connected to the system bus 306 via an interface, such as a video adapter 344. In addition to the monitor 342, computer systems typically include other peripheral output devices (not shown), such as speakers and printers.

The computer system 300 may operate in a networked environment using logical connections to one or more remote computers, such as a remote computer 346. The remote computer 346 may be a computer system, a server, a router, a network PC, a peer device or other common network node, and typically includes many or all of the elements described above relative to the computer system 300. The network connections include a local area network (LAN) 348 and a wide area network (WAN) 350. Such networking environments are commonplace in offices, enterprise-wide computer networks, intranets, and the Internet.

When used in a LAN networking environment, the computer system 300 is connected to the local network 348 through a network interface or adapter 352. When used in a WAN networking environment, the computer system 300 typically includes a modem 354 or other means for establishing communications over the wide area network 350, such as the Internet. The modem 354, which may be internal or external, is connected to the system bus 306 via the serial port interface 340. In a networked environment, program modules depicted relative to the computer system 300, or portions thereof, may be stored in the remote memory storage device. It will be appreciated that the network connections shown are exemplary, and other means of establishing a communication link between the computers may be used.

In an embodiment of the present invention, the computer system 300 stores the configuration data and implementation code providing the catalog infrastructure and disclosed and claimed herein in accordance with the present invention. The catalog infrastructure has without limitation one or more datastores, catalog servers, runtime catalogs, server applications, administration tools, dispensers, and wiring databases. Specifically, one or more dispensers, preferably including a table dispenser and a table object dispenser, provide a table object to a caller providing location and type independent access to configuration information stored in one or more datastores.

Preferably, table objects for accessing one or more datastores in a computer system are obtained via one or more table dispensers or table object dispensers. To access one or more datastores, a caller obtains a table object by passing input parameters to a table dispenser. The table dispenser references a wiring database to determine an appropriate configuration of table objects needed to return the desired table object to the caller. Dispensers are described in more detail in U.S. patent application Ser. No. 09/360,445, now U.S. Pat. No. 6,466,943, entitled "OBTAINING TABLE OBJECTS USING TABLE DISPENSERS", filed concurrently herewith and incorporated herein by reference for all that it discloses and teaches.

Figure 4:
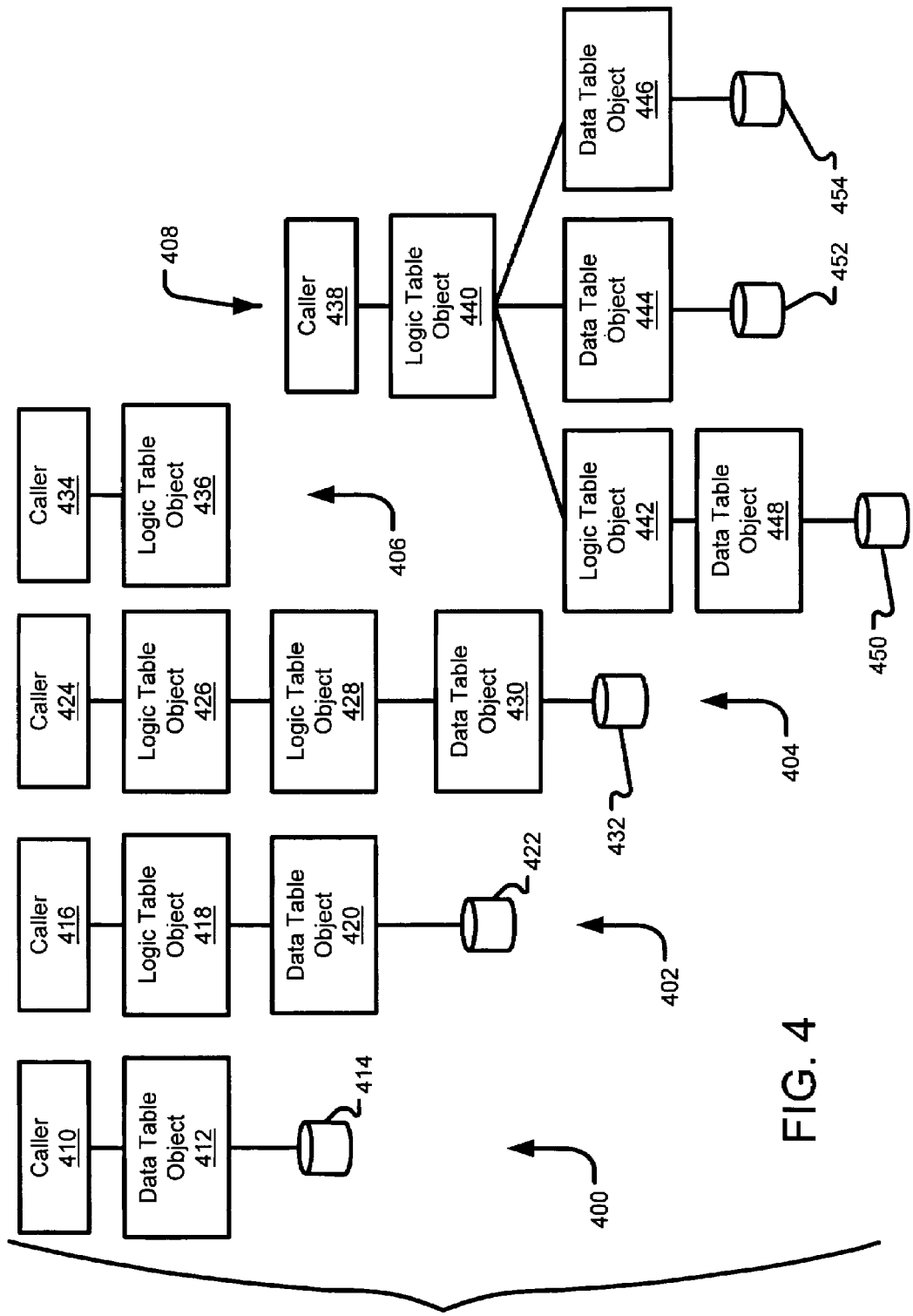
FIG. 4 depicts various examples of table system configurations in an embodiment of the present invention.

FIG. 4 depicts various examples of table systems in embodiments of the present invention. Logic table and data table objects are described in the description of FIG. 2 and the incorporated references. With regard to a table system 400, a caller 410 (as well as other callers in FIG. 4) may be a catalog server, a runtime catalog, or another object requiring abstracted access to a datastore. To initiate access to requested information, the caller 410 provides input parameters, such as a database ID, a table ID, query parameters, and a level of service parameter, relating to the configuration information it is requesting. A table dispenser (see the table dispenser 502, for example, in FIG. 5A) returns to the caller 410 a pointer to a table object, in this case a single data table object 412 bound to a datastore 414. Through a table interface accessible via the pointer to the data table object 412, the caller 410 can access tabularized configuration data (i.e., a data level table) originating from the datastore 414.

With regard to a table system 402, the table dispenser provides a caller 416 with an interface of a logic table object 418, which overlays a data table object 420. The data table object 420 is bound to a datastore 422 and provides access to a data level table of configuration data originating from the datastore 422 to the logic table object 418. Through a table interface provided to caller 416, the logic table object 418 can present to the caller a logic level table of configuration information, including without limitation (1) a remapping (i.e., an alternate table configuration) of the data provided by data table object 420; (2) supplemental functionality (e.g., validation of data); and (3) synthesized data (e.g., data not resident in datastore 422, but instead, data derived or calculated from data in datastore 422 or another source). The logic table object 418 can also trigger external operations.

With regard to a table system 404, two levels of logic table objects (i.e., logic table objects 426 and 428) are positioned between a caller 424 and a data table object 430, which is bound to a datastore 432. Preferably, functionality is modularized using multiple logic table objects. For example, the logic table object 426 may be responsible for enforcing security constraints on accesses to configuration data, whereas the logic table object 428 may validate data before writing configuration data to the datastore 432. Other functional combinations are possible at the discretion of the developer. In an embodiment of the present invention, the combinations of logic table and data table objects required to satisfy a requested database ID and table ID are specified in a wiring database accessed by the table dispenser.

With regard to a table system 406, a caller 434 has access to configuration data through a logic table object 436 without an underlying data table object or datastore. The logic table object 436 may provide table-based synthesized data to the caller or otherwise provide or trigger functionality outside the scope of the catalog's tables. For example, the logic table object 436 may intercept calls to an unsupported datastore and return errors to the caller 434. Alternatively, the logic table object 436 may translate or remap table data originally provided by the caller 434 or an external source, rather than by a datastore.

With regard to a table system combination 408, a caller 438 gains access to configuration data originally stored in or derived from datastores 450, 452, or 454. A logic table object 440 logically merges or consolidates data from a logic table object 442, data table object 444, which is bound to datastore 452, and data table object 446, which is bound to datastore 454. The logic table object 442 overlays a data table object 448, which is bound to datastore 450. In this configuration, the logic table object 440 logically merges data from the underlying catalog tables and presents the configuration data as a logic level table to the caller 438.

Figure 5:
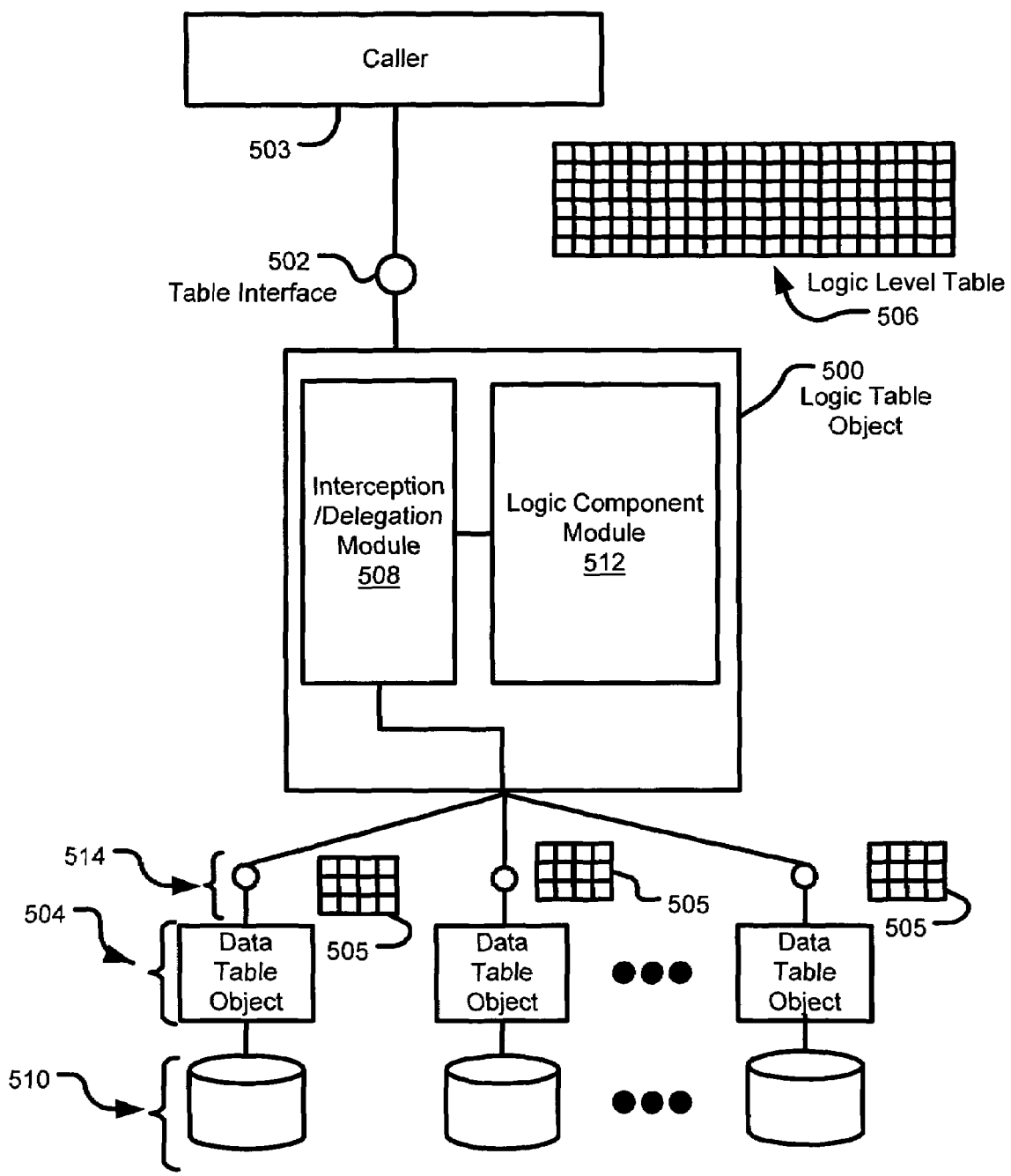
FIG. 5 depicts a logic table object in an embodiment of the present invention.

FIG. 5 depicts a logic table object in an embodiment of the present invention. A logic table object 500 presents a table interface 502 to a caller 503. The table interface 502 is compatible with the interface presented by the data table objects 504. The table interface 502 is compatible with, and preferably identical to, the data table interfaces 514. The table interface 502 includes methods for navigating rows of a table, retrieving configuration information values from columns of a logic level table 506, reading metadata from the logic level table or a column thereof, deleting rows from the logic level table 506, inserting and updating rows from the logic level table 506, updating a datastore, populating a read cache from a datastore, and other advanced operations. In an embodiment of the present invention, metadata is read to define a schema of a logic level table or data level table.

Cursor methods are a type of table-oriented method supported by a logic table embodiment of the present invention. Table 1 includes descriptions of cursor methods in an exemplary table interface:

Table 1

An Exemplary Table Interface Presented by a Table Object

| Method | Description |
| --- | --- |
| PopulateCache | Populates the read cache from a datastore or an underlying table object, using the database, the table, and the query specified to the table dispenser. The previous cache contents, including pending changes, are discarded. The row cursor is restarted. The table dispenser makes the first (and typically the only) call to populate the read cache before providing the table cursor to its caller. |
| UpdateStore | Writes all pending changes in the write cache to the datastore and then clears the write cache. The UpdateStore method is not implemented in a read-only cache for which it preferably returns an error. |
| UpdateReadCache | Updates the read cache with the pending changes in the write cache. The row cursor is restarted. The contents of the datastore and the write cache remain unchanged. The UpdateReadCache method is not implemented on a read-only cache for which it preferably returns an error. |
| RestartRow | Restarts the row cursor just prior to the first row in the read cache. |
| GetNextRow | Moves the row cursor from the current row to the next row in the read cache. When preceded by RestartRow, the GetNextRow method moves the cursor to the first row in the read cache. When the cursor is on the last row or a new row, the GetNextRow method does not move the cursor and preferably returns an error. |
| MoveToRowByIdentity | Moves the row cursor to the unique row in the cache matching the identity specified in the method call. If the row does not exist, the MoveToRowByIdentity method returns an error and does not move the cursor. |

Table 1-continued

An Exemplary Table Interface Presented by a Table Object

| Method | Description |
| --- | --- |
| MoveToNewRow | Moves the cursor to a new row held by the cursor. The MoveToNewRow method is used in combination with the SetRow method, which inserts the row into the write cache. All non-default columns are first set with SetColumn. The SetRow method must be called before the cursor moves. The MoveToNewRow returns an error on a read-only cache. |
| DeleteRow | Marks a current row deleted in the write cache. The DeleteRow method returns an error on a read-only cache. |
| SetRow | Updates the write cache (not the datastore) with the changes made to the current row. If the row is from MoveToNextRow, but the row is already identified in a read cache, the write cache is still updated with changes to the row. The SetRow method returns an error on a read-only cache. |
| SetColumn | Prepares to set column i of the current row using the data supplied in the input parameters of the method call. The change is held by the cursor until SetRow is called. If the data type of the supplied data only requires four bytes, the caller passes the data directly; otherwise, the caller passes the data by reference and, therefore, must retain the data until SetRow is called. If column i is out of range, the SetColumn method returns an error. The SetColumn method also returns an error on a read-only cache. |
| GetColumn | Gets the data for column i of the current row. If column i is out of range, then GetColumn returns an error. |
| CloneCursor | Supplies another cursor, initially at the same location in the read cache as the current cursor. |

In order to implement the table interface 502, a logic table object preferably intercepts all cursor method calls from the caller 503. "Intercepting" involves receiving a cursor method call to a table object and performing logical operations independent of operations that could be obtained by merely delegating the cursor method call to an underlying table object. In some cases, intercepting can completely replace delegation to the corresponding cursor method in an underlying table object. More specifically, the caller calls a given cursor method indicated by a pointer in a virtual table (vtable) associated with the logic table object 500, passing appropriate parameters to the cursor method. A virtual table containing the addresses (pointers) for the methods and properties of each table object.

The operations that occur on the logic table object side of the table interface 502 are transparent to the caller 503. As such, in response to each call, the logic table object 500 can supplement the functionality of underlying table objects, directly delegate processing to one or more underlying tables, or entirely provide its own functionality to complete the call.

In an embodiment of the present invention, a logic table object 500 provides an abstraction layer between the caller 503, which is presented with a logic level table 506, and one or more data table objects 504, which are bound to respective datastores 510. The logic table object 500 includes an interception/delegation module 508, which associates cursor methods and/or data in the logic table object 500 to the logic level table 506. The interception-delegation module 508 of the illustrated embodiment may also delegate calls to the table interfaces of one or more underlying data table objects 504. In alternative embodiments, one or more other logic table objects can be underlying table objects. By delegating, the logic table object 500 effectively passes the call through to one or more underlying data table objects (e.g., by calling a corresponding cursor method of the underlying table object with equivalent or otherwise appropriate calling parameters). By intercepting, however, the logic table object 500 can provide additional logic (e.g. supplemental functions, synthesized data, mapping, or consolidation) responsive to the call.

While it is possible to delegate by passing a call to an underlying cursor method, an optimized method of delegation avoids the overhead of the unnecessary "second" call. When direct delegation is desired (i.e., without mapping, supplemental logic, or synthesis), a pointer directly to the cursor method of an underlying table object can replace the pointer to the logic table object's cursor method in the vtable. In this manner, although the caller anticipates it is calling a cursor method in the logic table object, the pointer in the vtable actually directs processing to the cursor method in the underlying table object. When the cursor method call completes, processing returns directly to the calling process.

Depending on the specific implementation of the logic table object 500, the additional logic triggered by an interception event and provided by one or more logic component modules 512 may include logical merging or consolidation of configuration information from multiple underlying data level tables 505 and/or other underlying logic level tables (not shown). Logic table objects may additionally or alternatively supplement underlying table functionality by intercepting cursor method calls from a client and adding to or overriding the underlying table object's functionality. Alternately or additionally, the logic table object 500 can synthesize data that is not available from the underlying datastores or table objects and present the synthesized data as part of the logic level table 506 presented to the caller 503.

Figure 6:
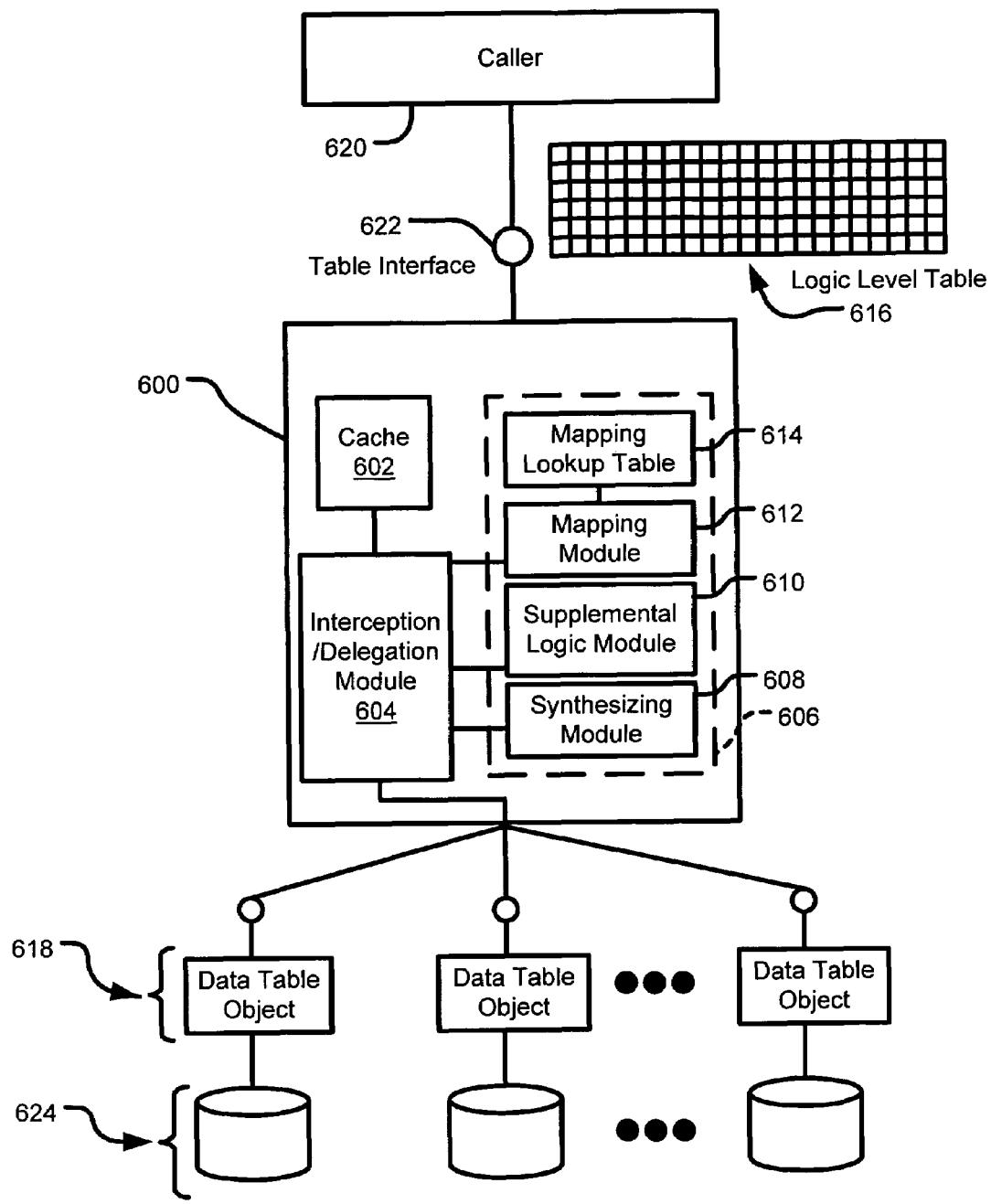
FIG. 6 depicts a logic table object including a cache and individual logic component modules in an embodiment of the present invention.

FIG. 6 depicts a logic table object including a cache and individual logic component modules in an embodiment of the present invention. The cache may include a read cache, a write cache, or both. A logic table object 600 in an embodiment of the present invention includes a cache 602, an interception/delegation module 604, and logic component modules 606. The logic component modules 606 comprise one or more synthesizing modules 608, one or more supplemental logic modules 610, or one or more mapping modules 612 and a mapping lookup table 614. It should be understood that many combinations of the cache 602, the synthesizing module 608, the supplemental logic module 610, and the mapping module 612 are possible within the scope of the present invention. That is, depending on the requirements of the logic table object, a logic table dispenser may include the cache and all of the modules, no cache and one or more modules, some intermediate combination of the cache and modules, or only one of the modules or cache.

Preferably, the mapping lookup table 614 is used in combination with a mapping module 612. However, alternate mapping methods may be used in another embodiment of the present invention including, without limitation, of those implemented by IF-THEN-ELSE constructs or CASE tables.

In a preferred embodiment, data structure elements corresponding to each row and column element (e.g. coordinate) of the logic level table 616 are recorded in a memory structure as a mapping lookup table 614. The data structures in the mapping lookup table 614 preferably include mapping instructions, such as an identifier of the data table object corresponding to coordinates of the logic level table 616, the corresponding coordinates of the underlying table object to which the logic level coordinates corresponds, and/or a pointer to additional logic. Accordingly, upon receiving a cursor method call relating to a coordinate in logic level table 616, the interception/delegation module 604 calls a mapping module 612 to determine the mapping to a corresponding coordinate in an underlying data table 618. The mapping module 612 locates the data structure corresponding to the coordinate of the logic level table 616 and returns to the interception/delegation module 604 a pointer and coordinates to the corresponding underlying table object 618, as well as optional additional data associated with the coordinates in the underlying table object. It should be understood that more than one underlying table object and coordinate combination may be returned by the mapping module if the cursor method applies to multiple underlying table objects. The interception/delegation module 604 then calls a cursor method in each corresponding table object using the pointer or pointers returned from the mapping module 612.

With regard to the supplemental logic module 610, the interception/delegation module 604 intercepts a call from the caller and calls supplemental logic module 610 to provide additional logical operations. The supplemental logic can consist of multiple stages, that is, the supplemental logic module 610 can pre-process or post-process a delegation to one or more underlying table objects 618. Alternatively, the supplemental logic module 610 can completely replace a cursor method of an underlying table object 618, foregoing delegation and returning to the caller (without calling a cursor method in an underlying table object).

Examples of supplemental logic include without limitation enforcing complex relationships among column values in a row when a caller attempts to change the values in a column, filtering server-side row or column reads depending on the security level of a caller, enforcing and managing complex relationships among different tables as those tables change, and triggering external functionality that lies outside the scope of the catalog tables, responsive to predetermined table changes. A complex relationship between column values might require that a component release date in one column not change unless the version (or "build") designation changes in another column for the same component (i.e., row).

In an embodiment of the present invention, one or more synthesizing modules 608 correspond to one or more coordinates in the logic level table 616 and provide or derive data not available from an underlying table object or datastore. For example, a commonly used catalog table (e.g., corresponding to "components") includes data logically merged from multiple data level tables and datastores. Each row of a data level table corresponds to a component in the system and its corresponding properties. A synthesizing module 608, however, may be implemented to provide an index for each component having a given property. The caller can then access each index via a coordinate in the logic level table 616.

In an embodiment of the present invention, the call associated with the "index" coordinate of the logic level table 616 is intercepted by the interception/delegation module 604, which calls the mapping module 612 to determine the underlying table object and coordinate. A data structure in the mapping lookup table 614 indicates that the data source for the requested cell is provided by a synthesizing module 608 (preferably indicated by a pointer to a synthesizing function).

Figure 7:
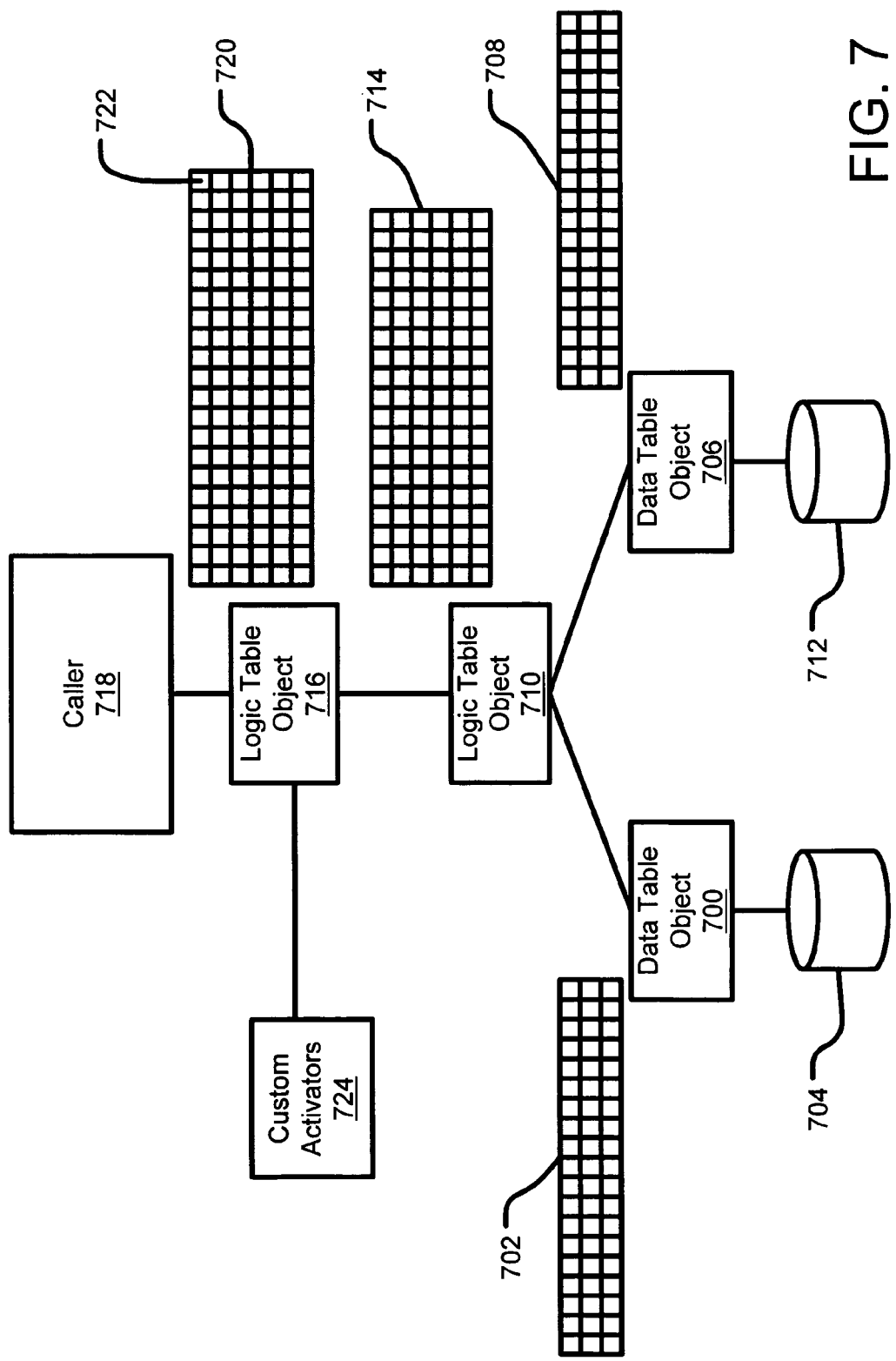
FIG. 7 illustrates exemplary results of data consolidation, triggering, and data synthesis in an embodiment of the present invention.

FIG. 7 illustrates exemplary results of table consolidation, triggering, and data synthesis in an embodiment of the present invention. A data table object 700 presents logic table object 710 with a data level table 702 derived from datastore 704. Likewise, data table object 706 presents a logic table object 710 with a data level table 708 derived from datastore 712. The logic table object 710 consolidates or logically merges all or part of the data level table 702 and data level table 708 into logic level table 714 presented to a logic table object 716. In the illustrated embodiment, the logic level table 714 consists of the logical merger or concatenation of the entire data level table 702 and the entire data level table 708. However, it is likely that the logic table object 710 merely requires a subset of merged table data to satisfy the configuration data request from the caller 718. Likewise, the organization within the rows and columns of the logic level table 714 may differ dramatically from the organization of a mere concatenation of data level tables 702 and 708. The structure of logic level table 714 is determined by the interception/delegation module of the logic table object 710 and a predetermined set of logic component modules, particularly a mapping module.

In the illustrated embodiment, a logic table object 716 overlays the logic table object 710, and presents to the caller 718 with a logic level table 720 that is bigger than the underlying logic level table 714. The two additional columns in table 720 are generated by one or more synthesizing modules in the logic table object 716. Accordingly, the caller 718 can query the column value 722, even though that logic level table's coordinates do not originate from an underlying table or datastore. It should be understood, that in an alternative embodiment, table 720 can have any desired size or configuration in accordance with the logic table object 716.

The logic table object 716 also provides supplemental logic by triggering an external operation in custom activator 724. Custom activators may be related, for example, to activation security (also called launch security) in the COM+ environment that controls which processes can launch a server process. Activation security is automatically applied by the Service Control Manager (SCM) of a particular machine through a custom activator. Upon receipt of a request from a client to activate an object, the custom activator checks the request against activation-security information stored within the configuration information in the system. Activation security is also checked for activations within the same machine as the client.

Figure 8:
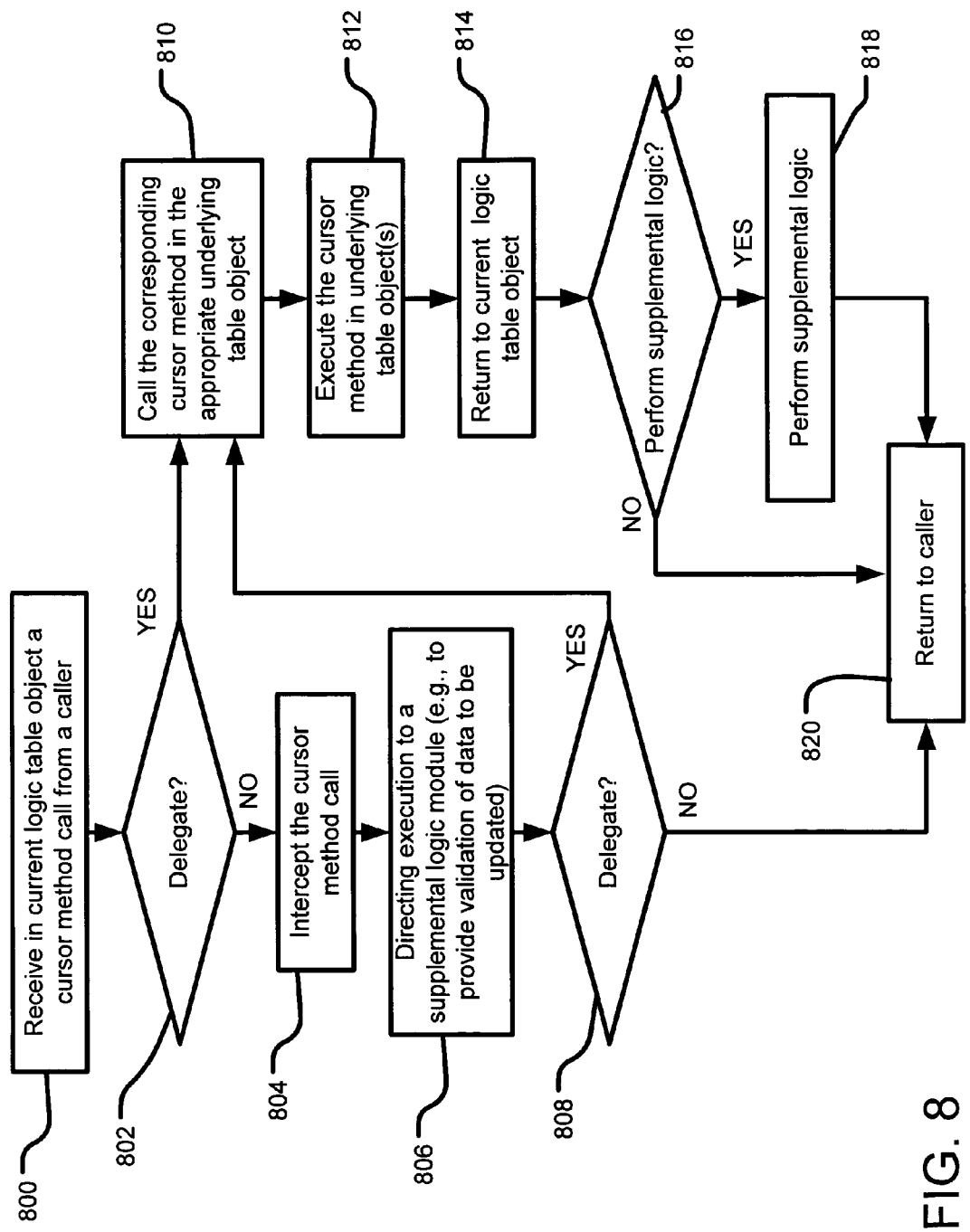
FIG. 8 illustrates a flowchart of operations for providing supplemental table logic in an embodiment of the present invention.

FIG. 8 illustrates a flowchart of operations for providing supplemental table logic in an embodiment of the present invention. Operation 800 receives a cursor method call from a caller into the current logic table object. That is, a caller attempts to access data or manipulate the cursor relative to the logic level table presented by the logic table object. Operation 802 determines whether the cursor method call is delegated to an underlying table object. The determination of whether direct delegation (as opposed to interception) that occurs in operation 802 can be accomplished in several ways including (1) receiving the call to the cursor method of the logic table object, which merely calls the corresponding cursor method in one or more underlying table objects; and (2) "fixing up" the vtable associated with the logic table object's cursor methods to reference an underlying table object's cursor method directly (i.e., replacing in the vtable the pointer to the logic table object's cursor method with the pointer to the underlying table object's cursor method).

In the "fix up" method, the caller calls the cursor method referenced by a pointer in the vtable, anticipating that it is calling the cursor method in the logic table object. Instead, because of the "fix-up", the cursor method in the underlying table object is executed transparently. After the underlying table object's method completes, it returns directly to the caller. This optimized method of delegation avoids the cost of the extra indirection in the logic table object.

If delegation does not occur at operation 802, operation 804 intercepts the cursor method call and directs processing to additional logic, which may include without limitation the supplemental logic provided by the module 610, the data generation of the synthesizing module 608, and the mapping of the mapping module 612 (see FIG. 6). As shown, processing is directed to a supplemental logic module in operation 806, which executes to perform a one or more domain-specific operation (e.g., validation, security enforcement, etc.).

Operation 808 also determines whether delegation occurs. It should be understood that, in one embodiment, operations 802 and 808 are based on the placement of function calls to a cursor method in an underlying table, and that there need be no dynamic determination of delegation at any particular point in the process. Alternatively, however, the delegation can be made conditional on other events or data, wherein operations 802 and 808 may be dynamic determination operations. Furthermore, delegation may occur at any point during the cursor method processing of the logic table object, thereby accommodating supplemental logic pre-processing and/or post-processing for the cursor method of the underlying table object. If there is no delegation at operation 808, then processing returns to the caller in operation 820.

If delegation is determined in operation 802 or 808, operation 810 calls the corresponding cursor method in an underlying cursor method. If the logic table object logically merges more than one lower-level table, then a mapping module is preferably called to determine the appropriate underlying table object or objects that should be called in the delegation. Operation 812 executes the corresponding cursor method in the underlying table object or objects. Operation 814 returns processing to the current logic table object. Operation 816 determines whether supplemental post-processing is provided. As with delegation operations 802 and 808, operation 816 is preferably provided by the placement of post-processing supplemental logic code in the cursor method of the logic table object, which is executed in operation 818. Operation 820 returns processing to the caller.

Figure 9:
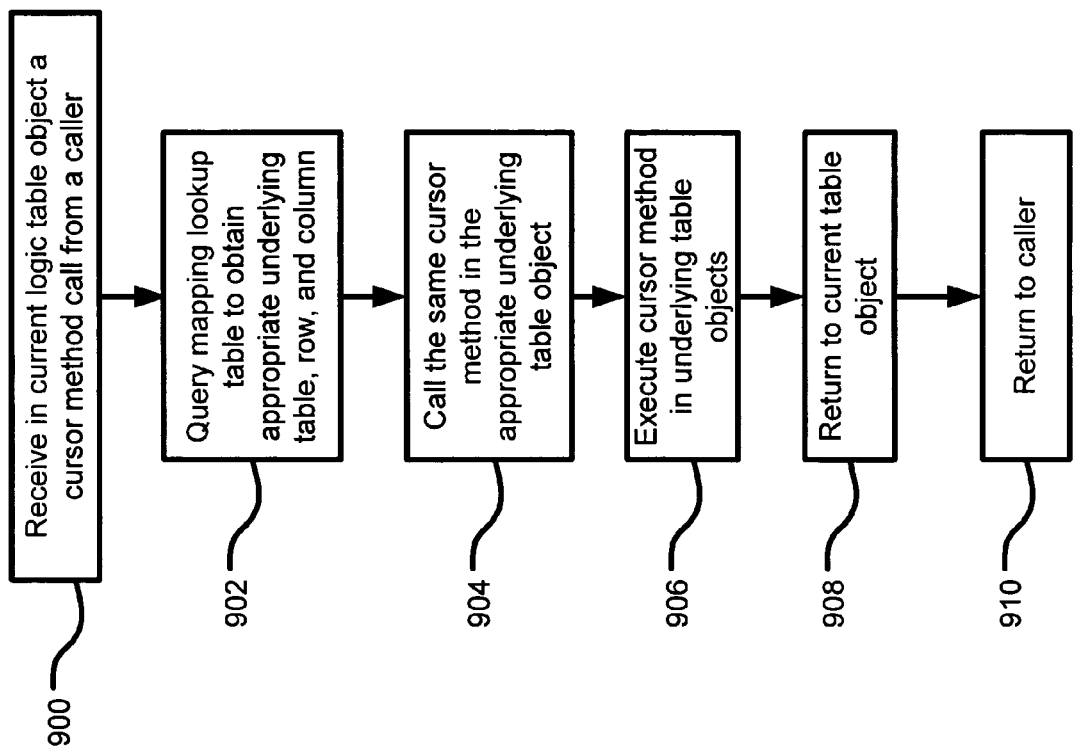
FIG. 9 illustrates a flowchart of operations for mapping table data an embodiment of the present invention.

FIG. 9 illustrates a flowchart of operations for mapping table data an embodiment of the present invention. The operations relate to a table system such as that illustrated in FIGS. 5 and 6, in which a single logic table object overlays multiple data table objects. Operation 900 receives a cursor method call from a caller requesting access to configuration information. Operation 902 determines the mapping instructions by querying the mapping lookup table to obtain the appropriate underlying table object or table objects and coordinates to which a cursor call should be delegated. Operation 904 calls the corresponding cursor methods in the underlying table objects, providing the mapped coordinates and any other information required by the underlying methods. Operation 906 executes the corresponding cursor methods in the underlying table objects. Operation 908 returns processing to the logic table object. Operation 910 returns processing to the caller.

FIG. 10 illustrates a flowchart of operations for synthesizing data in an embodiment of the present invention. Operation 1000 receives a cursor method call from a caller. The cursor method call specifies functionality relative to a given coordinate in the logic level table. The coordinate may be provided as a parameter in the method call or stored internally in the logic table object. Operation 1002 intercepts the cursor method and references the mapping lookup table to determine the proper mapping for the cursor method call. In the illustrated flowchart, the coordinate does not map to corresponding coordinates in underlying tables. Instead, the mapping module returns a pointer to a synthesizing logic module. Operation 1004 executes the synthesizing logic module to generate data. The data synthesis may rely on data retrieved in operation 1006 from the logic level table, from underlying tables, and from other internal external sources. Operation 1008 performs the synthesis of the data corresponding to the logic level table coordinates associated with the cursor method call. Operation 1010 returns processing to the caller.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the a manufacture and use of the composition of the invention. Since many embodiments of the invention can be made without departing from the spirit and scope of the invention, the invention resides in the claims hereinafter appended.

I claim:

1. A computer-readable storage medium having computer-executable components executed by a computer system causing the computer system to provide access to Component Object Model (COM) configuration data about applications and services, in a runtime environment, sourced by one or more datastores, the components comprising:

a runtime catalog accessible by a server application and running on a server; one or more table object dispensers called by the runtime catalog in response to a request for COM configuration data; and a table system created by the one or more table object dispensers in response to the runtime catalog, the table system providing the COM configuration data to the server application, the server application executing with the COM configuration data, the table system including:

one or more datastores to store the COM configuration data;

one or more logic table objects to present the COM configuration data; and one or more data table objects created by the one or more logic table objects, each data table object exposing a table cursor into one of the datastores, each data table object bound to one of the datastores;

wherein the one or more logic table objects supplement functionality of the one or more data table objects by intercepting interface calls and providing, at least one of, additional and overriding functionality of the one or more data table objects or the one or more logic table objects synthesize data, according to a type of request for COM configuration data, which is not available from the one or more data table objects.

2. The computer-readable medium as defined in claim 1, wherein the table cursor is a predetermined table-oriented interface that hides the location and format of the underlying datastore.

3. The computer-readable medium as defined in claim 1, wherein two or more data table objects access one datastore.

4. The computer-readable medium as defined in claim 1, wherein the one or more data table objects populate one or more internal caches with read-write data associated with the bound datastore.

5. The computer-readable storage medium as defined in claim 4, wherein queries to the bound datastore are responded to with data in the one or more internal caches through the table interface of the data table object.

6. The computer-readable storage medium as defined in claim 1, wherein the one or more logic table objects provide one or more callers with access to COM configuration data.

7. The computer-readable storage medium as defined in claim 6, wherein the one or more logic table objects present the COM configuration data in a virtual table format with a predetermined table interface.

8. The computer-readable storage medium as defined in claim 1, wherein the COM configuration data in the one or more logic table objects is accessed by a table-oriented interface that includes a table cursor method.

9. The computer-readable storage medium as defined in claim 1, wherein the logic table object presents domain-specific COM configuration data.

10. The computer-readable storage medium as defined in claim 9, wherein the domain-specific COM configuration data is defined by one or more input parameters.

11. The computer-readable storage medium as defined in claim 10, wherein the one or more input parameters include at least one of a database ID, a table ID, a query parameter, and a level of server parameter.

12. The computer-readable storage medium as defined in claim 1, wherein the one or more logic table objects merge COM configuration data from at least two of the one or more data table objects and the one or more logic table objects.

13. A computer-readable storage medium having computer-executable components executed by a computer system causing the computer system to provide access and management of Component Object Model (COM) configuration data about applications and services, in a configuration-time environment, sourced by one or more datastores, the components comprising:

an administration tool to present COM configuration data to a caller;

one or more client table objects, the one or more client table objects providing COM configuration data for the administration tool to present to the caller;

one or more catalog server objects, each of the client table objects bound to a catalog server object, each catalog server object executing on a single computer, managing COM configuration data on the single computer, and receiving all calls for COM configuration data located on the single computer; and one or more table systems created by the one or more catalog server objects in response to a request for COM configuration data, each table system providing COM configuration data to the one or more catalog server objects, the table system including: one or more datastores to store the COM configuration data;

one or more first logic table objects to present the COM configuration data;

one or more data table objects created by the one or more first logic table objects, each data table object exposing a table cursor into one of the datastores, each data table object bound to one of the datastores;

wherein COM configuration data is related from the table system to the administration tool and presented to the caller; and wherein the one or more first logic table objects supplement functionality of the one or more data table objects by intercepting interface calls and providing, at least one of, additional and overriding functionality of the one or more data table objects or the one or more first logic table objects synthesize data, according to a type of request for COM configuration data, which is not available from the one or more data table objects.

14. The computer-readable storage medium as defined in claim 13, having further computer-executable components comprising:

one or more second logic table objects created by the administration tool, the one or more second logic table objects creating the one or more client table objects, wherein the one or more second logic table objects receive the COM configuration data from the client table objects and provide the COM configuration data to the administration tool in a table format.

15. The computer-readable storage medium as defined in claim 14, wherein one of the second logic table objects is a multiple-domain specific logic table object that communicates with two or more client table objects.

16. The computer-readable storage medium as defined in claim 14, wherein the one or more second logic table objects present the COM configuration data in a virtual table format with a predetermined table interface.

17. The computer-readable storage medium as defined in claim 13, wherein the table cursor is a predetermined table-oriented interface that hides the location and format of the underlying datastore.

18. The computer-readable storage medium as defined in claim 13, wherein two or more data table objects access one datastore.

19. The computer-readable storage medium as defined in claim 13, wherein the one or more data table objects populate one or more internal caches with read-write data associated with the bound datastore.

20. The computer-readable storage medium as defined in claim 19, wherein queries to the bound datastore are responded to with data in the one or more internal caches through the a table interface of the data table object.

21. The computer-readable storage medium as defined in claim 13, wherein the one or more first logic table objects provide one or more callers with access to COM configuration data.

22. The computer-readable storage medium as defined in claim 21, wherein the COM configuration data in the one or more first logic table objects is accessed by a table-oriented interface that includes a table cursor method.

23. The computer-readable storage medium as defined in claim 13, wherein the first logic table object presents domain-specific COM configuration data.

24. The computer-readable storage medium as defined in claim 23, wherein the domain-specific COM configuration data is defined by one or more input parameters.

25. The computer-readable storage medium as defined in claim 24, wherein the one or more input parameters include at least one of a database ID, a table ID, a query parameter, and a level of server parameter.

26. The computer-readable storage medium as defined in claim 13, wherein the one or more first logic table objects merge COM configuration data from at least two of the one or more data table objects and the one or more first logic table objects.

27. The computer-readable storage medium as defined in claim 13, wherein both local and remote requests for COM configuration data are responded to by the catalog server object on the single computer.

28. The computer-readable storage medium as defined in claim 13, wherein the one or more catalog server objects include one or more local catalog server objects executed on a local client computer to manage COM configuration data on the local client computer and one or more remote catalog server objects executed on a remote computer to manage COM configuration data on the remote computer.

29. The computer-readable storage medium as defined in claim 28, wherein the remote computer is a server computer.

* * * * *

UNITED STATES PATENT AND TRADEMARK OFFICE
CERTIFICATE OF CORRECTION

| | | |
|---|---|---|
| PATENT NO. | : 7,337,174 B1 | |
| APPLICATION NO. | : 09/360440 | |
| DATED | : February 26, 2008 | |
| INVENTOR(S) | : Robert M. Craig | |

It is certified that error appears in the above-identified patent and that said Letters Patent is hereby corrected as shown below:

In column 18, line 59, in Claim 20, after "the" delete "a".

Signed and Sealed this

Fifteenth Day of February, 2011

David J. Kappos
*Director of the United States Patent and Trademark Office*